(12) United States Patent
Ham et al.

(10) Patent No.: US 8,335,545 B2
(45) Date of Patent: Dec. 18, 2012

(54) MODULAR CHARGING DOCK

(75) Inventors: Soohyun Ham, San Francisco, CA (US); Matthew Charles Bentley, Scotts Valley, CA (US); Andrew Kneeland Richardson, Santa Cruz, CA (US); Nicholas Kennedy Eisner, Ben Lomond, CA (US)

(73) Assignee: Plantronics, Inc., Santa Cruz, CA (US)

( * ) Notice: Subject to any disclaimer, the term of this patent is extended or adjusted under 35 U.S.C. 154(b) by 849 days.

(21) Appl. No.: 12/209,134

(22) Filed: Sep. 11, 2008

(65) Prior Publication Data
US 2010/0062731 A1 Mar. 11, 2010

(51) Int. Cl.
*H04M 1/00* (2006.01)

(52) U.S. Cl. ............. 455/573; 455/569.1; 455/572; 379/428.02; 379/430

(58) Field of Classification Search ............ 455/569.1, 455/572, 573; 379/428.02, 428.04, 430–431; 381/309, 74
See application file for complete search history.

(56) References Cited

U.S. PATENT DOCUMENTS

2008/0152183 A1* 6/2008 Janik et al. ............. 381/375

* cited by examiner

*Primary Examiner* — Raymond Dean
(74) *Attorney, Agent, or Firm* — Haynes and Boone, LLP

(57) ABSTRACT

A headset radio base, a headset charging system including a modular charging dock, and methods of charging various headsets are disclosed. In one embodiment, a headset radio base includes a charging dock interface configured to interface with one of a plurality of interchangeable charging docks having different form factors for charging different headsets, a transceiver for wirelessly communicating with the different headsets, a power source interface, and a network interface.

22 Claims, 8 Drawing Sheets

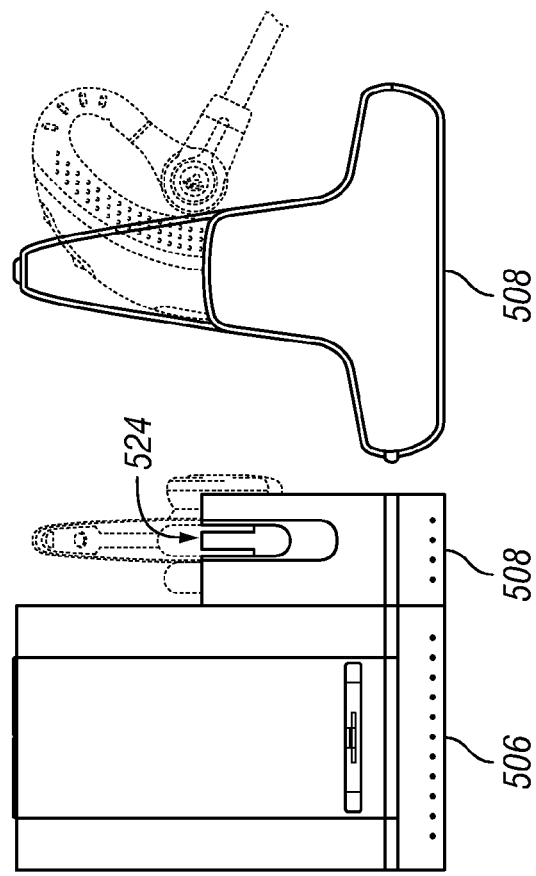
FIG. 5B
FIG. 5C
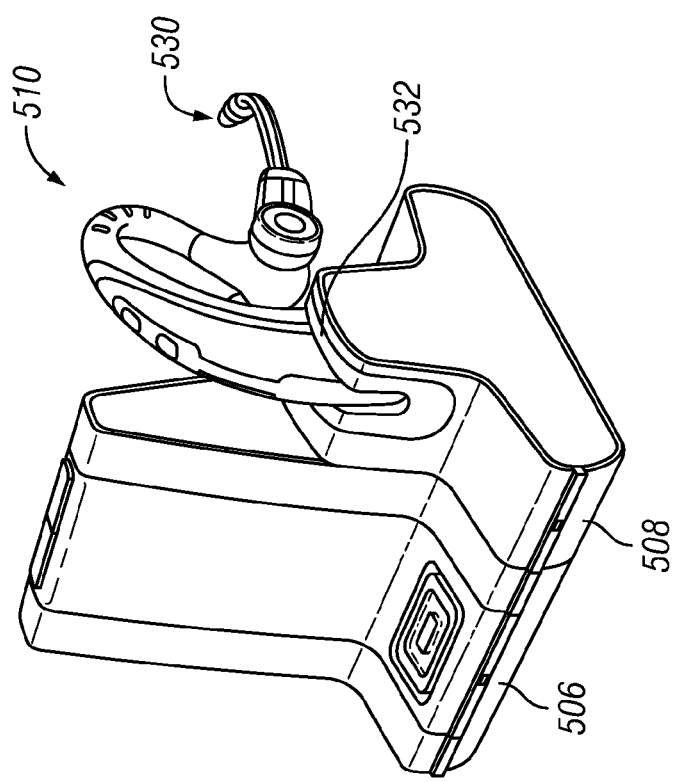
FIG. 5A

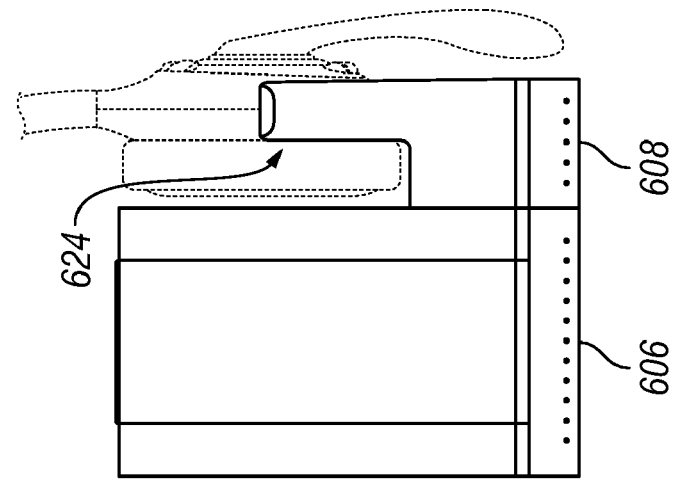
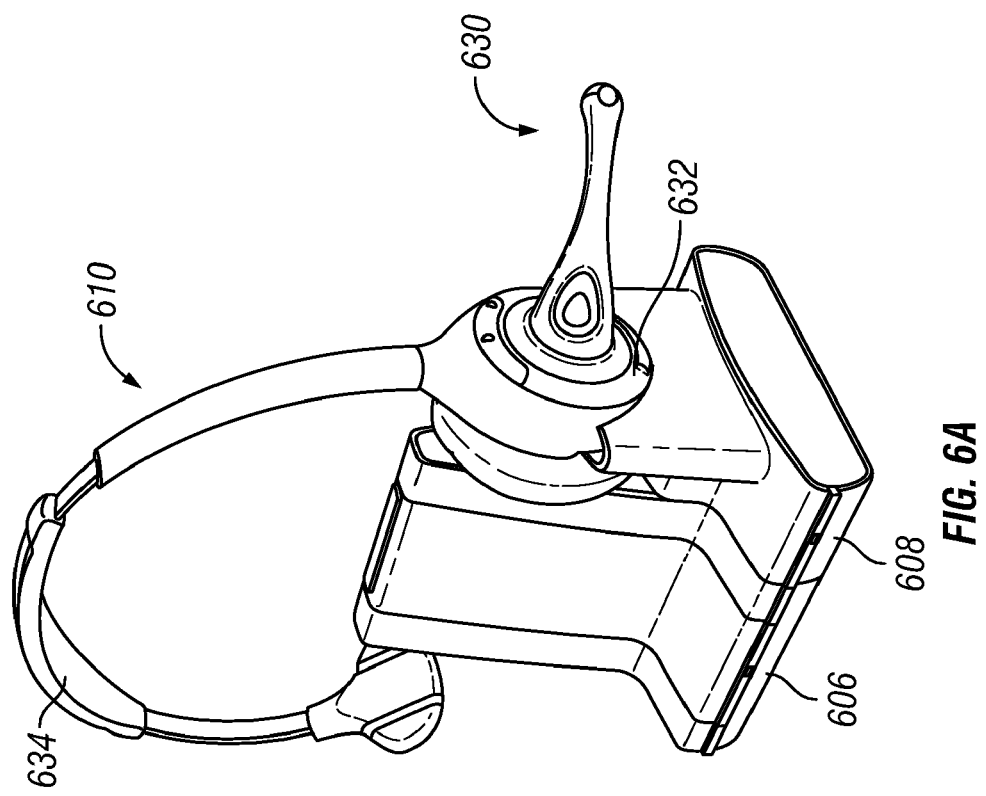

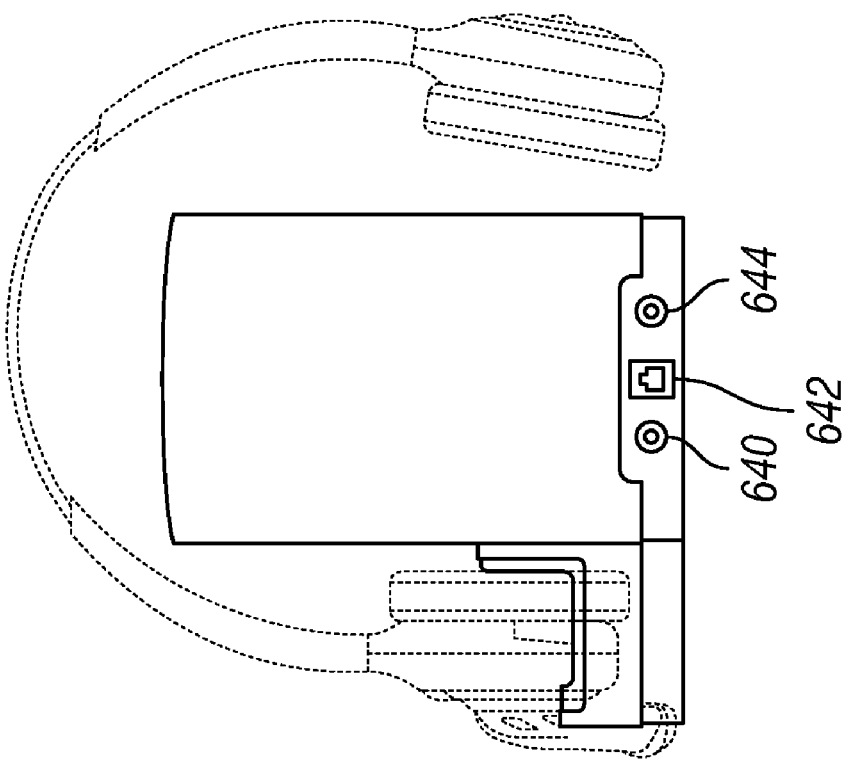
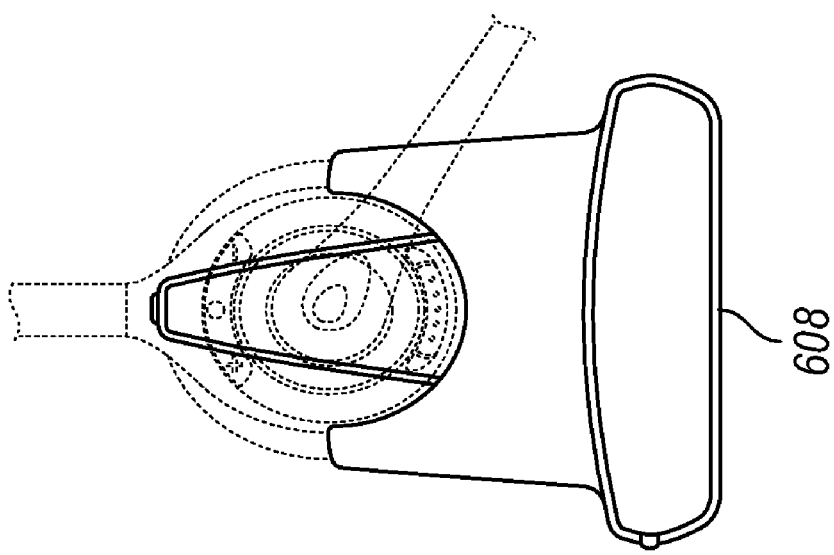

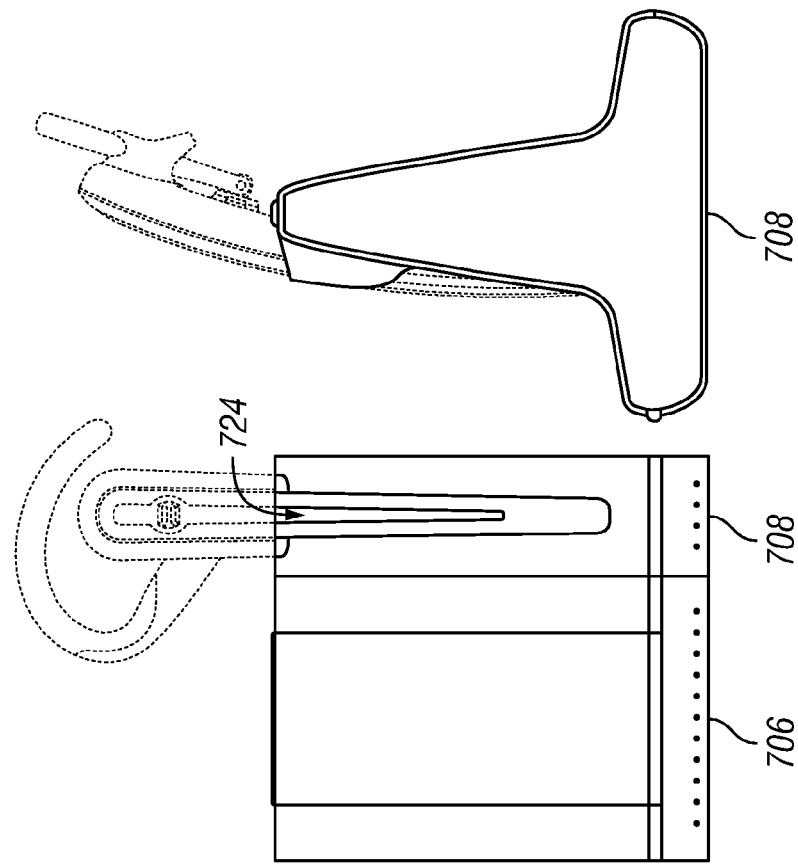
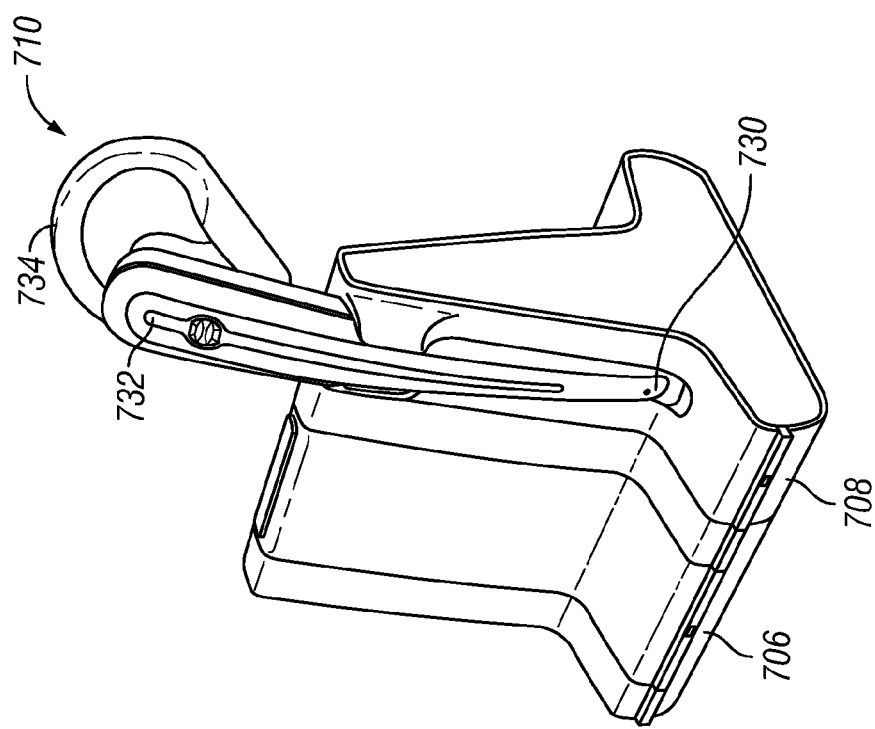

MODULAR CHARGING DOCK

BACKGROUND

1. Field of the Invention

This invention generally relates to headsets and, more particularly, to a wireless headset system, apparatus, and method.

2. Description of Related Art

Communication headsets are used in numerous applications and are particularly effective for telephone operators, radio operators, aircraft personnel, and for any user for whom it is desirable to have hands free operation of communication systems. Accordingly, a wide variety of conventional headsets are available with different shapes and designs, including over-the-head type headsets, over-the-ear type headsets, and in-the-ear type headsets. Furthermore, headsets may be adapted for use with a variety of devices, including corded and cordless telephones, soft phones, cellular phones, PDAs, and the like.

Wireless headsets and other portable communications devices are often battery powered such that a user can use the wireless headset or other such device without being directly connected to larger power sources such as an AC outlet or automobile battery. This allows wireless headset users flexibility and convenience to move about without being tied to a power cord. Wireless headset batteries are generally rechargeable so that the batteries can be recharged and need not be discarded after use.

In the prior art, devices employing rechargeable batteries typically have charging contacts so that charging current can be supplied to recharge the batteries without removing the batteries from the device. In one typical setup, the portable device is inserted into a base charger which has contacts that correspond to and couple with the contacts on the portable device. For example, such a setup is used with remote handset phones used in the home. The base charger is connected to a power source, and supplies charging current through the coupled contacts to recharge the batteries located within the device.

Wireless headsets may be also be charged using a docking station such as a desktop charger, or other combined storage and charging mechanism to facilitate the charging of the wireless headset. However, systems have not been previously available to flexibly charge a variety of headsets having different form factors using a single radio base. Furthermore, since the charging base and radio base for the headset have been inseparably integrated in prior systems, headset charging and storage have been further constrained and inflexible.

Therefore, there is a need in the art for a wireless headset charging/storage system, apparatus, and method that is simple to use, cost-effective, and flexible.

SUMMARY

In accordance with the present invention, a headset radio base, a headset charging system including a modular charging dock, and methods of charging various headsets are disclosed.

In one embodiment of the invention, a headset radio base includes a charging dock interface configured to interface with one of a plurality of interchangeable charging docks having different form factors for charging different headsets, a transceiver for wirelessly communicating with the different headsets, a power source interface, and a network interface.

In another embodiment of the invention, a wireless headset system includes a headset radio base as described above, and an interchangeable charging dock operably coupled to the charging dock interface.

In yet another embodiment, a method of charging headsets includes providing a headset radio base as described above, coupling a power source to the power source interface, coupling a first charging dock to the charging dock interface, docking a first headset on the first charging dock to charge the first headset, interchanging the first charging dock with a second charging dock, and docking a second headset in the second charging dock to charge the second headset.

In yet another embodiment, a method of charging headsets includes providing a headset radio base as described above, coupling a power source to the power source interface, coupling a power source to a first charging dock not electrically or mechanically coupled to the radio base, and docking a first headset in the first charging dock to charge the first headset.

Advantageously, the present invention provides a single radio base that can be used with different charging docks to charge and/or store various headsets having various form factors in a cost-effective, simple, and flexible manner. For example, a user can purchase a headset system and later upgrade or switch to another type of headset without purchasing a completely new system by keeping the radio base and only replacing the headset and the charging dock. In an office and/or call center environment, a single radio base can be shared by multiple users each having a different headset.

These and other features and advantages of the present invention will be more readily apparent from the detailed description of the embodiments set forth below taken in conjunction with the accompanying drawings.

BRIEF DESCRIPTION OF THE DRAWINGS

FIGS. 5A-5C illustrate different views of components of a wireless headset system including a first charging dock mounted to a radio base and a corresponding first headset in accordance with an embodiment of the present invention.

FIGS. 6A-6D illustrate different views of components of a wireless headset system including a second charging dock mounted to a radio base and a corresponding second headset in accordance with an embodiment of the present invention.

FIGS. 7A-7C illustrate different views of components of a wireless headset system including a third charging dock mounted to a radio base and a corresponding third headset in accordance with an embodiment of the present invention.

Figure 1:
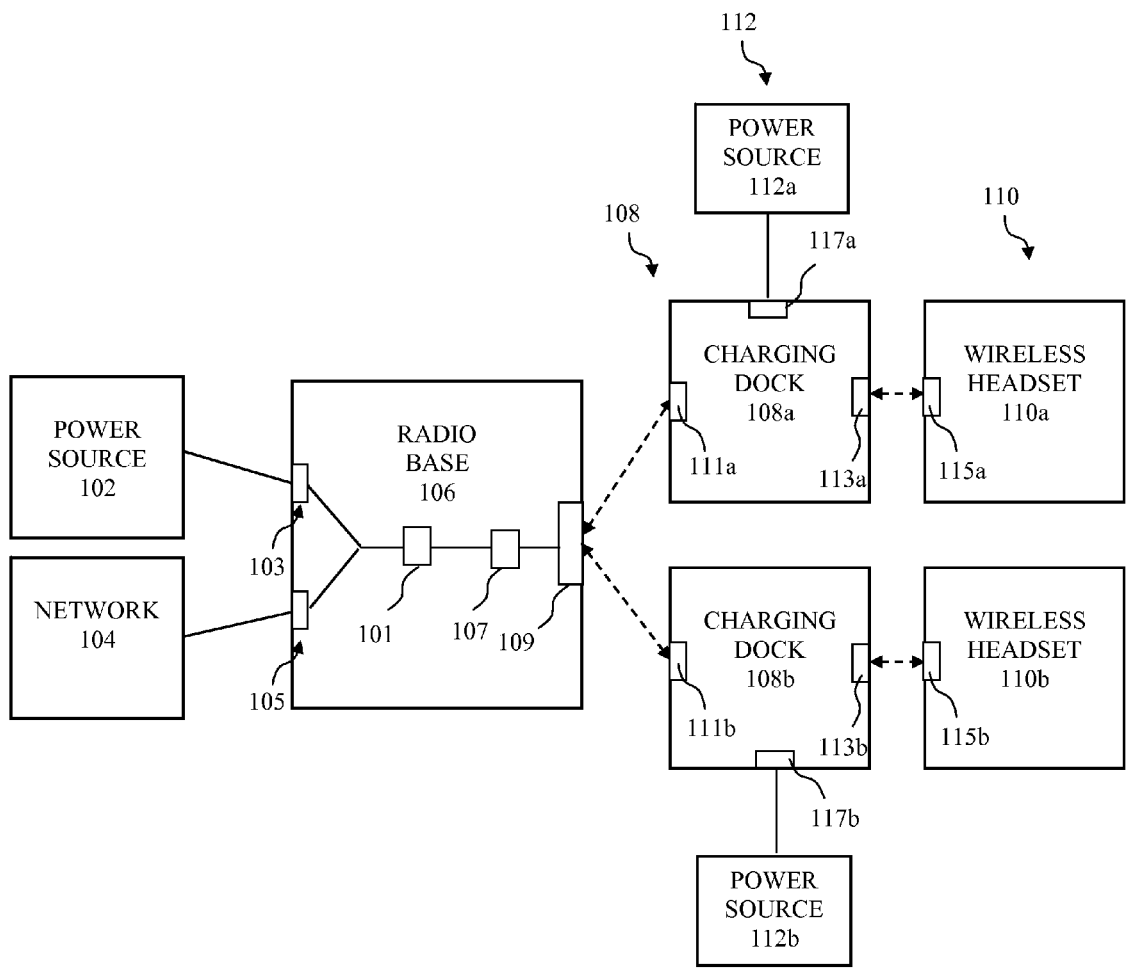
FIG. 1 illustrates a wireless headset system including a modular charging dock in accordance with an embodiment of the present invention.

Embodiments of the present invention and their advantages are best understood by referring to the detailed description that follows. It should be appreciated that like reference numerals in different figures indicate similar or identical items. It should also be appreciated that the figures may not be necessarily drawn to scale.

DETAILED DESCRIPTION

In accordance with the present invention, systems, apparatus, and methods are disclosed for utilizing a single radio base with interchangeable, modular, and independently chargable charging docks to charge and/or store headsets having different form factors, allowing for advantageous flexibility in headset use and charging.

Referring now to FIG. 1, a wireless headset system including a modular charging dock is illustrated in accordance with an embodiment of the present invention. The headset system includes a radio base 106 operably couplable to a power source 102, a network 104, and a modular, interchangeable, and independently chargeable charging docking 108 (such as one of charging docks 108a or 108b which are each specific to a headset. A wireless headset 110 (such as one of wireless headsets 110a or 110b) corresponds to a charging dock 108 (such as charging dock 108a or 108b, respectively), and may electrically communicate with an electrical contact of the charging dock via an electrical contact of the headset.

Power source 102 may include, in one example, one or more various power sources including an alternating current adapter, a direct current adapter, a battery (e.g., alkaline, NiCad, or Lithium batteries in AA or AAA form factors, or various other suitable types of batteries), or a solar cell.

Network 104 may include, in one example, one or more various networks such as a local area network (LAN), a wide area network (WAN), the Internet, a public switched telephone network, and so on.

Radio base 106 includes a power source interface 103 that is operably couplable to power source 102, a network interface 105 that is operably couplable to network 104, a processor 101 coupled to network interface 105 and power source interface 103, a transceiver 107 for communicating with a wireless headset coupled to processor 101, and a charging dock interface 109 that is operably couplable to charging dock 108, such as charging docks 108a or 108b.

Power source interface 103 includes an electrical connector operably couplable to one or more of various power sources 102, examples of which have been described above. In one example, power source interface 103 may also include connectors for connection to a cord that is coupled to a main AC power supply of the type utilized with a common wall outlet, and/or an AC/DC power converter which converts an external power supply to a standard DC voltage which is usable by the charging dock 108 for charging a battery within the headset 110. In other examples, power source interface 103 may include electrical connectors for interfacing with a battery and/or a solar cell to name a few examples.

Network interface 105 operably couples radio base 106 to network 104, and in one example, may include interfaces and sockets for a RJ-11 connector, an Ethernet cable, or a 2-3.5 mm plug, which may be used to operably connect the radio base and an associated headset to a network or an audio source, such as a telephone handset and a PSTN, a cellular telephone and a cellular network, or a computer and the Internet or a LAN.

Charging dock interface 109 is operably couplable to a radio base interface of the charging dock 108 (e.g., radio base interfaces having electrical contacts 111a or 111b), and may include one or more various electrical contact means and methods and one or more various mechanical mounting means and methods for operably coupling to charging dock 108. Applicable electrical contact means include but are not limited to contact strips, pogo pins and apertures, plugs and sockets, an electrical wire and a connector at a free end of the wire that can operably mate with another electrical connector, and so on. Applicable mechanical mounting means and methods include protrusions and recesses, pogo pins and apertures, sliding means, tabs, and so on. For example, the charging dock interface 109 may include a protrusion for coupling to a recess of a charging dock or, alternatively, a recess for coupling to a protrusion of the charging dock 108. It is noted that various electrical and mechanical contact means and methods may be used between the components of the headset system (e.g., between the radio base and the charging dock or between the charging dock and the headset), as more fully disclosed in commonly assigned U.S. Pat. No. 7,075,270, which is incorporated by reference herein in its entirety for all purposes.

Power source interface 103 is electrically coupled to charging dock interface 109, for example by a wire or other electrical connection enclosed within a housing of radio base 106. Power source interface 103, network interface 105, processor 101, transducer 107, and a portion of charging dock interface 109 may also be housed by the radio base housing. The housing is preferably made of a lightweight organic polymer, but can be comprised of any suitable material. An underside portion of the housing provides support and a non-scratching material for the bottom of the radio base, in one example. Thus, power from power source 102 is transferred through power source interface 103, charging dock interface 109, contacts in the charging dock, and mating contacts in a docked headset to charge the headset batteries.

Processor 101 and transceiver 107 allows for communication between network 104 and a wireless headset. Transceiver 107 both transmits and receives/detects digital and/or analog signals, and in the context of the present invention is able to detect wireless signals from a wireless headset requesting access to a network, and is further able to detect signals through a network wire and apply signals onto the network wire. Transceiver 107 is able to support various wireless protocols, including but not limited to Bluetooth, digital enhanced cordless telecommunications (DECT), and IEEE 802.11, such that wireless headsets 108 can then gain access to network 104. Processor 101 may be a high performance, highly integrated, and highly flexible system-on-chip (SOC) in one example, including signal processing functionality. The processor may include a variety of processors (e.g., digital signal processors) with conventional CPUs being applicable.

Radio base 106 may further include other components, such as memory, circuitry or processors, in one example for controlling the supply of charging current to an inserted device based on the battery status, and indicators for identifying the charging status of the headset battery. The radio base may also provide teleconferencing, hook switch, and computer/telephone switching functionality. Circuitry and associated components may be mounted on a printed circuit board (PCB) disposed within the radio base. The headset system may also include various features such as a vibrate ring feature, a caller ID display, and/or a visual ring indicator. Each feature may be directly integrated in the radio base 106, another component of the system, and/or on the headset itself but is accessible and/or visible while the headset is stored on the radio base.

The charging dock 108 is mountable to a side of the radio base housing, in one example, and includes a radio base interface including an electrical contact for electrical communication with radio base 106 (e.g., electrical contacts 111a or 111b), an electrical contact for electrical communication with a headset (e.g., electrical contacts 113a and 113b of the charging docks are operably couplable to electrical contacts 115a and 115b of the headsets, respectively), and a recess or cavity for receiving a headset 110. As noted above, various structures may be utilized for electrical contacts 111a, 111b or 113a, 113b, such as contact strips, pogo pins and apertures, plugs and sockets, and so on, as more fully disclosed in commonly assigned U.S. Pat. No. 7,075,270, which has been previously incorporated by reference herein in its entirety for all purposes.

The charging dock recess or well properly guides and docks the headset such that conductive contacts 115a or 115b disposed on the headset are properly aligned with the electrical contacts 113a or 113b in the charging dock. Thus, the charging dock 108 can serve as an electrical and mechanical interface between the radio base and the headset, but is also able to independently charge the headset mechanically and electrically apart from radio base 106. In one example, charging dock 108 includes a power source interface (e.g., power source interface 117a or 117b) that is couplable to a power source (e.g., power source 112a or 112b). The power source interface of the charging dock and couplable power source are similar to those described above in association with power source interface 103 and power source 102, respectively, and further description is omitted.

Figure 2:
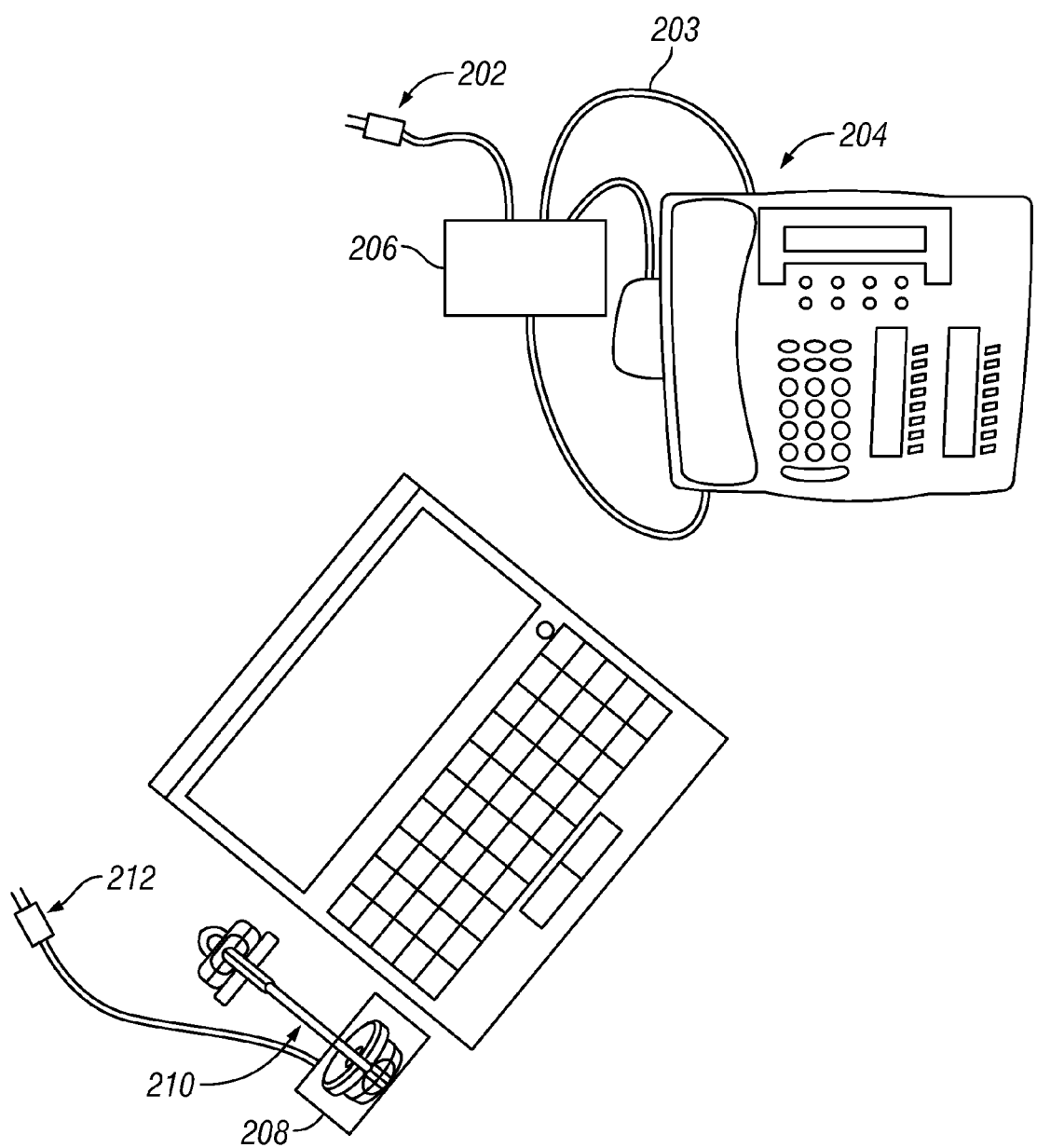
FIG. 2 illustrates the use of the wireless headset system of FIG. 1 in a modular mode in accordance with an embodiment of the present invention.

Referring now to FIG. 2, an example of the wireless headset system of FIG. 1 in a modular mode is illustrated in accordance with an embodiment of the present invention. In this example, radio base 206 is operably coupled to a network 204, such as a PSTN, through a wire 203 to a telephone, and a power source 202 through an AC power supply outlet. An optional wire may also couple radio base 206 to a lifter on the telephone for allowing remote call answer/end functionality. Modular charging dock 208 has a headset 210 mounted thereon and can charge the headset independently from radio base 206 via a power source 212 through an AC power supply outlet. Other power sources are applicable as noted above. Advantageously, the modular nature of charging dock 208 allows for flexible charging and/or storage arrangements for the user, and various types and numbers of headsets may be charged, being particularly advantageous in environments where multiple headsets are used, such as in call centers with multiple shifts. Furthermore, while a headset is being separately charged from radio base 206, radio base 206 may still communicate with headset 210 as necessary to indicate incoming calls or messages and to allow network connection for the headset when desired.

Various charging docks may be configured to receive various types, shapes and/or configurations of headsets and the headsets shown and described below are merely examples suitable for use with the headset charging system, apparatus, and methods of the present invention.

Different charging docks, their respective headsets that are mountable on the charging docks, and a radio base will now be illustrated and described in accordance with embodiments of the present invention.

Figure 3:
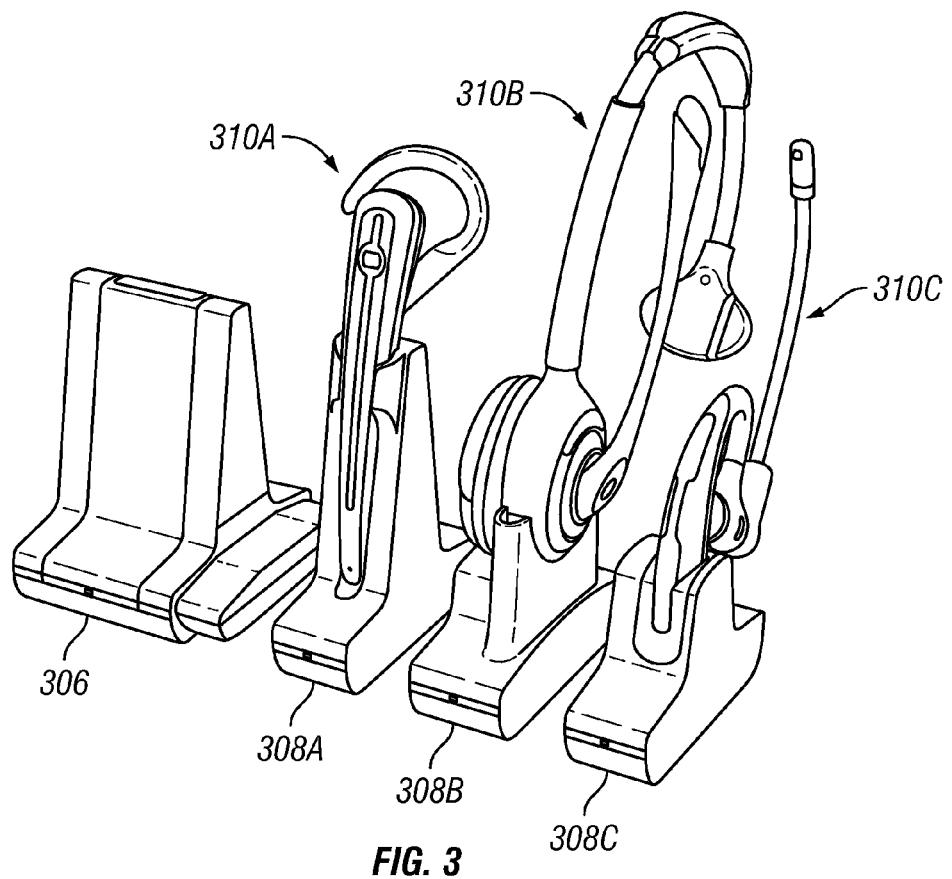
FIG. 3 illustrates perspective views of components of a wireless headset system including a radio base and a plurality of interchangeable charging docks with corresponding headsets in accordance with an embodiment of the present invention.

FIG. 3 illustrates perspective views of components of a wireless headset system including a radio base 306 and a plurality of interchangeable charging docks 308a, 308b, 308c with corresponding headsets 310a, 310b, 310c, respectively, in accordance with an embodiment of the present invention.

Figure 4:
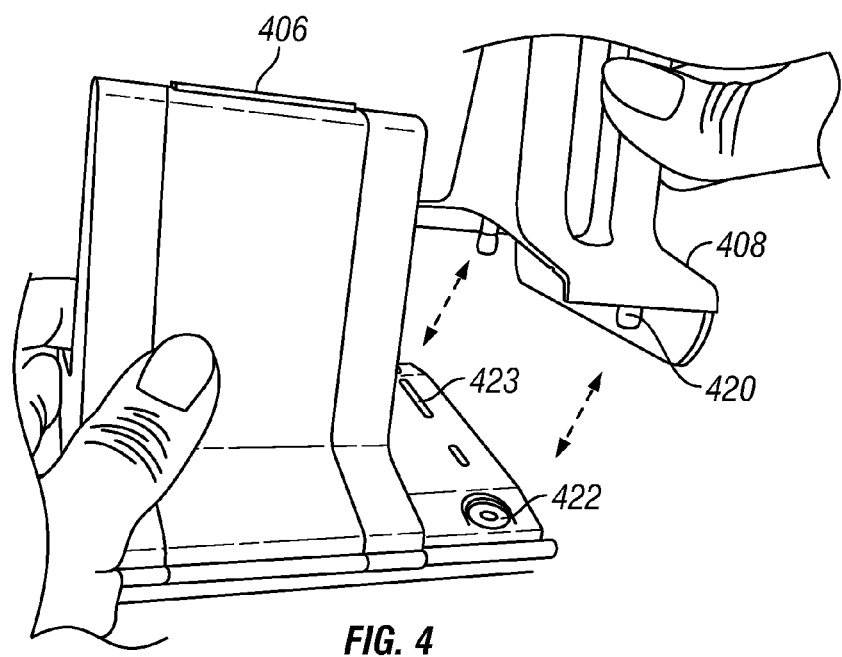
FIG. 4 illustrates the coupling or decoupling of a modular charging dock with a radio base.

FIG. 4 illustrates the coupling or decoupling of a modular charging dock 408 with a radio base 406, as shown by the double-sided arrows. In one embodiment, pins 420 on charging dock 408 and apertures 422 on radio base 406 may be used to at least in part mechanically couple charging dock 408 and radio base 406. Alternatively, the pins and apertures may be switched between the charging dock and the radio base for mechanical coupling. For electrical coupling between charging dock 408 and radio base 406, conductive pins (not shown) of the charging dock adjacent a surface that interfaces with the radio base may couple to conductive slots or pads 423 on the radio base 406 in one example. Alternatively, the pins and slots/pads may be switched between the charging dock 408 and the radio base 406.

FIGS. 5A-5C illustrate different views of components of a wireless headset system including a first charging dock 508 mounted to a radio base 506 and a corresponding first headset 510 mounted to the charging dock 508 in a well 524 in accordance with an embodiment of the present invention. Charging dock 508 is operably coupled to radio base 506, in one example, being electrically and mechanically coupled via mating contacts, pins, and/or apertures.

When headset 510 is mounted on charging dock 508, electrical contacts of the charging dock operably mate with electrical contacts of headset 510, thereby electrically coupling headset 510 to charging dock 508. In a further example, charging dock 508 includes a cavity or well portion 524 that mechanically receives a portion of headset 510 when the headset is docked. In this embodiment, headset 510 is an over-the-ear type of headset and includes a microphone tube 530 to enable two-way voice communication by the user, and a speaker housing 532 that houses an internal speaker, which in one example is an electro-acoustic speaker that receives audio signals from an audio signal source and may comprise a known type of electromagnetic, piezoelectric, or electrostatic type of driving element, or a combination thereof, or even some other form of driving element, for generating sound waves from the output face of the speaker. It is noted however that various applicable speakers may be used.

Headset 510 is a wireless headset that supports Bluetooth, DECT, Wifi, or other wireless protocol. The illustrative headset shown and described is also a monaural headset having a single audio receiver for placement near one ear and configured to fit around the ear to secure the receiver in place. However, it is to be understood that various charging docks may be configured to receive various other types, shapes and/or configurations of headsets and that the monaural headset shown and the other headsets shown and described below are merely examples suitable for use with the headset charging system, apparatus, and methods of the present invention.

FIGS. 6A-6D illustrate different views of components of a wireless headset system including a second charging dock 608 mounted to a radio base 606 and a corresponding second headset 610 mounted to the charging dock in a well 624 in accordance with an embodiment of the present invention. Charging dock 608 is operably coupled to radio base 606, in one example, being electrically and mechanically coupled in a similar manner as described above with respect to FIGS. 5A-5C, utilizing electrical contacts and mechanical mounts such as contact strips, pogo pins and apertures, tabs, and so on. In a further example, charging dock 608 includes a cavity or well portion 624 that mechanically receives a portion of headset 610 when the headset is docked. In this embodiment, headset 610 is an over-the-head type of headset and includes a microphone tube 630, a speaker housing 632, and a band 634. Various interfaces at the back of radio base 606 including sockets 640, 644 for 2-3.5 mm plugs and a socket 642 for an RJ-11 connector are illustrated for coupling to a telephone, computer, or other node of a network. Other interfaces, such as for an Ethernet cable, are also within the scope of the present invention.

FIGS. 7A-7C illustrate different views of components of a wireless headset system including a third charging dock 708 mounted to a radio base 706 and a corresponding third headset 710 mounted to the charging dock in a recess 724 in accordance with an embodiment of the present invention. Charging dock 708 is operably coupled to radio base 706, in one example, being electrically and mechanically coupled in a similar manner as described above with respect to FIGS. 5A-5C, utilizing electrical contacts and mechanical mounts such as contact strips, pogo pins and apertures, tabs, and so on. In a further example, charging dock 708 includes a recess portion 724 that mechanically receives a portion of headset 710 when the headset is docked. In this embodiment, headset 710 is an over-the-ear type of headset and includes a microphone housing 730, a speaker housing 732, and an earloop 734.

Figure 8:
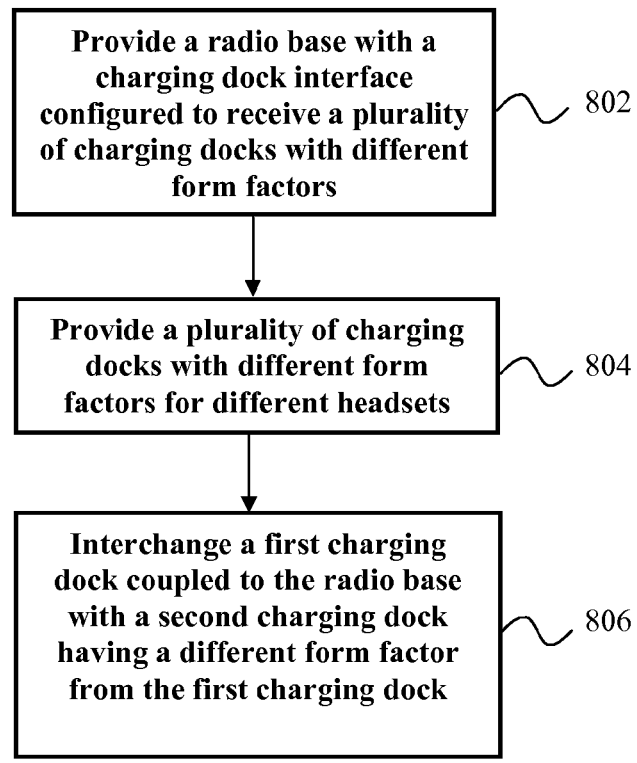
FIG. 8 is a flowchart of a method for charging headsets having different form factors with a single radio base in accordance with an embodiment of the present invention.
Figure 9:
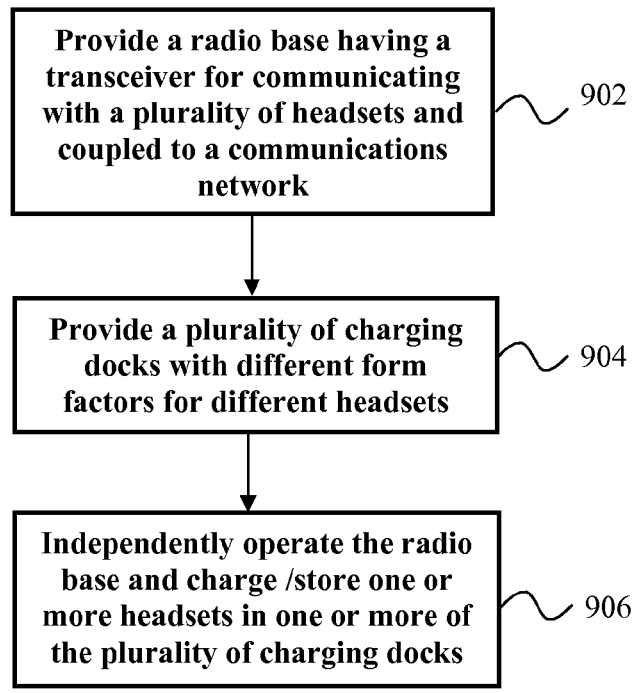
FIG. 9 is a flowchart of a method for charging headsets with a modular charging dock in accordance with an embodiment of the present invention.

Referring now to FIGS. 8 and 9, methods of using a wireless headset system including a modular and interchangeable charging dock are described.

FIG. 8 is a flowchart of a method for charging headsets having different form factors with a single radio base in accordance with an embodiment of the present invention. At step 802, a radio base similar to those described above is provided. The radio base includes a charging dock interface configured to interface with one of a plurality of interchangeable charging docks with different form factors, as provided for at step 804. At step 806, a first charging dock which is coupled to the radio base is interchanged with a second charging dock having a different form factor from the first charging dock. A different headset having a different form factor from a first headset can then be charged utilizing the same radio base.

FIG. 9 is a flowchart of a method for charging headsets with a modular charging dock in accordance with an embodiment of the present invention. At step 902, a radio base similar to those described above is provided. The radio base includes a network interface coupled to a communications network, a transceiver, and a processor for communicating with a plurality of wireless headsets and connecting the headsets to the network. At step 904 a plurality of charging docks with different form factors for receiving different headsets are provided. At step 906, one or more headsets are charged/stored in one or more charging docks not electrically and mechanically coupled to the radio base, allowing for greater flexibility in headset use and charging and also minimizing cost since only one radio base is required for a plurality of different headsets.

Advantageously, the present invention provides for a wireless headset charging/storing system, apparatus, and method that is cost-effective, simple, and flexible to use. A single radio base is disclosed that can be used with different charging docks to charge and/or store various headsets having various form factors. For example, a user can purchase a headset system and later upgrade or switch to another type of headset without purchasing a completely new system by keeping the original radio base and only replacing the headset and the charging dock. In an office and/or call center environment where there are multiple shifts or open seating offices, a single radio base unit can be shared by multiple users each having a different headset. Furthermore, coupling the charging dock to the radio base keeps the user experience simple and a user desk free of clutter.

The above-described embodiments of the present invention are merely meant to be illustrative and not limiting. It will thus be obvious to those skilled in the art that various changes and modifications may be made without departing from this invention in its broader aspects. For example, the charging docks may be mechanically and electrically coupled to a radio base by various means and methods besides those described above, and the charging dock may include more than one means of mechanical and/or electrical connection to a docked headset. Furthermore, the headset may be electrically coupled to the charging dock by various means and methods besides contact strips and pogo pins/recesses/pads. In a further example, a plurality of charging docks may be used simultaneously to charge and/or connect to a network with one radio base. Therefore, the appended claims encompass all such changes and modifications as falling within the true spirit and scope of this invention.

We claim:

1. A headset radio base, comprising:
    a charging dock interface configured to interface with one of a plurality of interchangeable charging docks having different form factors for charging different headsets;
    a transceiver for wirelessly communicating with the different headsets;
    a power source interface; and
    a network interface.

2. The radio base of claim 1, wherein the power source interface is operably couplable to one of an alternating current adapter, a direct current adapter, a battery, or a solar cell.

3. The radio base of claim 1, wherein the charging dock interface includes an electrical connector that can be coupled to a mating electrical connector of a charging dock.

4. The radio base of claim 1, wherein the charging dock interface includes one of pogo pins, contact strips, and contact apertures.

5. The radio base of claim 1, wherein the charging dock interface includes a protrusion for coupling to a recess of a charging dock or a recess for coupling to a protrusion of a charging dock.

6. The radio base of claim 1, further comprising a housing enclosing an electrical connection between the power source interface and the charging dock interface.

7. A wireless headset system, comprising:
    a headset radio base including:
        a charging dock interface configured to interface with one of a plurality of interchangeable charging docks having different form factors for charging different headsets; and
        a transceiver for wirelessly communicating with the different headsets; and
    an interchangeable charging dock operably coupled to the charging dock interface.

8. The system of claim 7, wherein the charging dock includes an electrical connector that can be coupled to a mating electrical connector of the charging dock interface.

9. The system of claim 7, wherein the charging dock includes one of pogo pins, contact strips, and contact apertures for electrical coupling to the charging dock interface.

10. The system of claim 7, wherein the charging dock includes a protrusion for coupling to a recess of the charging dock interface or a recess for coupling to a protrusion of the charging dock interface.

11. The system of claim 7, wherein the charging dock includes a recess for mechanically receiving a headset and an electrical contact for electrically communicating with the headset.

12. The system of claim 7, wherein the radio base and the charging docking each includes a power source interface.

13. The system of claim 12, wherein each power source interface is couplable to one of an alternating current adapter, a direct current adapter, a battery, or a solar cell.

14. The system of claim 7, wherein the charging dock includes a headset interface including one of pogo pins, contact strips, and contact apertures.

15. A method of charging headsets, the method comprising:
providing a headset radio base including:
a power source interface;
a charging dock interface configured to interface with one of a plurality of interchangeable charging docks having different form factors for charging different headsets;
a transceiver for wirelessly communicating with the different headsets; and
a housing enclosing an electrical connection between the power source interface and the charging dock interface;
coupling a power source to the power source interface;
coupling a first charging dock to the charging dock interface;
docking a first headset on the first charging dock to charge the first headset;
interchanging the first charging dock with a second charging dock; and
docking a second headset in the second charging dock to charge the second headset.

16. The method of claim 15, wherein the second charging dock has a different form factor from the first charging dock.

17. The method of claim 15, wherein coupling the first charging dock to the charging dock interface includes coupling an electrical connector of the charging dock interface to a mating electrical connector of the first charging dock.

18. The method of claim 15, wherein docking the first headset in the first charging dock includes coupling an electrical connector of the charging dock to a mating electrical connector of the first headset.

19. A method of charging headsets, the method comprising:
providing a headset radio base including:
a power source interface;
a charging dock interface configured to interface with one of a plurality of interchangeable charging docks having different form factors for charging different headsets;
a transceiver for wirelessly communicating with the different headsets; and
a housing enclosing an electrical connection between the power source interface and the charging dock interface;
coupling a power source to the power source interface;
coupling a power source to a first charging dock not electrically or mechanically coupled to the radio base; and
docking a first headset in the first charging dock to charge the first headset.

20. The method of claim 19, further comprising wirelessly communicating between the radio base and the first headset while charging the first headset.

21. The method of claim 19, further comprising:
coupling a power source to a second charging dock; and
docking a second headset in the second charging dock to charge the second headset.

22. The method of claim 21, wherein the second charging dock has a different form factor from the first charging dock.

* * * * *